(12) United States Patent
Chao et al.

(10) Patent No.: US 7,176,907 B2
(45) Date of Patent: Feb. 13, 2007

(54) DEVICE AND METHOD FOR POINTER SYSTEM OF DIGITIZER TABLET

(75) Inventors: Ching-Chuan Chao, SanChung (TW); Chung-Wen Hsu, KaoHsiung (TW)

(73) Assignee: Waltop International Corp., Hsin-Chu (TW)

( * ) Notice: Subject to any disclaimer, the term of this patent is extended or adjusted under 35 U.S.C. 154(b) by 376 days.

(21) Appl. No.: 10/277,752

(22) Filed: Oct. 23, 2002

(65) Prior Publication Data
US 2003/0217871 A1 Nov. 27, 2003

(30) Foreign Application Priority Data
May 24, 2002 (TW) .............................. 91110977 A

(51) Int. Cl.
*G09G 5/00* (2006.01)
(52) U.S. Cl. ................. 345/179; 178/18.07; 178/20.02
(58) Field of Classification Search ................ 345/173, 345/174, 179, 19, 178–9; 178/19.01, 19.03, 178/20.1, 20.2, 20.3, 20.4, 18.01
See application file for complete search history.

(56) References Cited

U.S. PATENT DOCUMENTS

| 4,205,199 A | * | 5/1980 | Mochizuki | 178/18.03 |
| 4,600,807 A | * | 7/1986 | Kable | 178/18.05 |
| 4,672,154 A | * | 6/1987 | Rodgers et al. | 178/19.07 |
| 4,717,793 A | * | 1/1988 | Kobayashi | 178/20.02 |
| 4,878,553 A | * | 11/1989 | Yamanami et al. | 178/18.07 |
| 5,567,920 A | * | 10/1996 | Watanabe et al. | 178/18.07 |
| 5,644,108 A | * | 7/1997 | Katsurahira et al. | 178/18.07 |
| 6,288,710 B1 | * | 9/2001 | Lee et al. | 345/173 |
| 6,744,426 B1 | * | 6/2004 | Okamoto et al. | 345/179 |

* cited by examiner

*Primary Examiner*—Sumati Lefkowitz
*Assistant Examiner*—Tammy Pham
(74) *Attorney, Agent, or Firm*—Troxell Law Office, PLLC

(57) ABSTRACT

The invention, an improved device and method for the pointer system of a digitizer tablet, is to repetitiously emit signals sequentially from a specific set of inductive loop when the position pointed by the wireless pointer device is located within a range formed by this specific set of inductive loop induced most intensively during a locally scanning process. After a transient energy storage of the wireless pointer device, corresponding resonant signals are emitted out and are received sequentially by several sets of inductive loop located on the digitizer tablet in the neighborhood of this specific set of inductive loop and, by these signals, the wireless pointer device's coordinate position on the digitizer tablet is calculated out relatively. Thereby, the intensities of the resonant signals received by these several sets of inductive loop will be displayed as a linear distribution, such that the calculation formula for coordinate position and the design for relative circuit elements may be simplified greatly, and the production cost and the power consumption may further be lowered down effectively.

24 Claims, 6 Drawing Sheets

DEVICE AND METHOD FOR POINTER SYSTEM OF DIGITIZER TABLET

FIELD OF THE INVENTION

The invention relates to an improved device and method for the pointer system of a digitizer tablet, particularly to a kind of apparatus improvement for both the wireless-and-batteryless pointer device and the digitizer tablet designed with the well-arranged electromagnetic inductive loops, and also to an improved approach for transmitting power between the wireless-and-batteryless pointer device and the electromagnetic inductive loops.

BACKGROUND OF THE INVENTION

As the applications of the information technology are extended widely and quickly, more and more information technology devices are developed and under research. In order to make computer more easily to be operated and used by the operator, more sophisticated and compatible devices for data input and process are also manufactured successively for different computer systems, wherein the most popular devices for the input of tracing point are the cursor device (such as mouse) or the stylus device (such as pen) for a digitizer tablet system.

The well-known digitizer tablet system has several transducer/cursor devices in the form of mouse, puck or pen. In order to find the position of a mouse or a pen on the surface of the digitizer tablet; that is, to calculate the coordinates and the variation of coordinates in a two-dimensional space, one most popular technique in the prior arts is to use the technology of electromagnetic inductive. On the digitizer tablet according to this technique, a plurality of electromagnetic inductive loops are applied to induce the signal from mouse or pen and, by a signal processing circuit and an A/D converter to convert and sample the inducing signal, such that the coordinates of the mouse or pen on the active area of the digitizer tablet are decided, and also are other functions decided, such as: scrolling, clicking, or tracing, etc.

Please refer to FIG. 1, which is an illustration for the part of the electromagnetic inductive loops of the prior digitizer tablet disclosed in the U.S. Pat. Nos. 4,878,553 and 5,028,745. As shown in FIG. 1, which is a part of the inductive loops used by the prior digitizer tablet, wherein it includes the electromagnetic inductive loops from L1 to L5. All of the electromagnetic inductive loops L1~L5 are belonged to a specific axis, and the covering range of the inductive loop L1 overlapping another two inductive loops L2, L3; that is, the range enclosed by an inductive loop contains the initial terminals of next two inductive loops and, in other words, the inductive loops L2, L3 are continuous loops to L1, and their covered ranges are overlapped partially. If the position of an pointer device on the active area of a digitizer tablet is P1, then the magnetic field that pointer device emitted on point P1 can be induced by the nearby loops, and the induced currents generated in these loops will be received by analog switches separately and respectively and, according to the magnitudes of these inducing signals, the coordinates of the point P1 is calculated and decided.

As shown in FIG. 1, as in partial scan, if the pointed position of the pointer device is within the loop range of the loop L3 then, for each loop L1 to loop L5, the scan procedures for the pointer device on point P1 on the active area of the digitizer tablet are to emit signals from inductive loops individually, which also receives its own emitted signals from the pointer device in receiving time slot; that is, the signal emitted from L1 will be induced by the pointer device and emitted the signal again from the pointer device and induced by L1, the signal emitted from L2 will be induced by the pointer device and emitted the signal again from the pointer device and induced by L2, the signal emitted from L3 will be induced by the pointer device and emitted the signal again from the pointer device and induced by L3, the signal emitted from L4 will be induced by the pointer device and emitted the signal again from the pointer device and induced by L4, and the signal emitted from L5 will be induced by the pointer device and emitted the signal again from the pointer device and induced by L5; the coordinates of point P1 where the pointer device is located will be calculated according to the magnitude of each signal emitted and induced by respective loops L1~L5, such that the coordinates of the point P1 and the performed functions are decided. For this prior-art technique, since the coordinates of point P1 where the pointer device is located on the active area of the digitizer tablet is calculated by the signals emitting, inducing, and receiving respectively by each nearby loop of the point P1, the magnitudes of these signals are displayed as a nonlinear relationship. Therefore, this prior technique has the disadvantage that its coordinates calculation approach is too complicated and the number of the applied circuit elements used in coordinates calculating is too many relatively. As a result, the cost is higher and, in the other hand, its' inducing ability is less stable, and apt to couple the noise easily. It is very urgent to solve all these problems.

In addition, one prior-art wireless pointer device (such as stylus) used in the prior digitizer tablet according to the U.S. Pat. Nos. 4,878,553 and 5,028,745 utilizes a variable capacitor to the circuit which related the mechanism of the tip's movement, wherein the circuit is parallel with several paralleled capacitors (three capacitors), and the variable capacitor is brought along with the tip of the pointer device, and the key switch of the pointer device is utilized to parallel another capacitor. When operating the pointer device on the tablet surface or pressing it upon the surface of the digitizer tablet, the tip of the pointer device will press the variable capacitor and cause the capacitance change such that, after the pointer device processing a resonant energy storage to the signals coming from the digitizer tablet, the resonant frequency of the electromagnetic signals emitted back to digitizer tablet will be slightly changed, and this slight change of frequency is regarded as the phase variation (the greater is the pressure coming from the pointer device, the lower is the frequency and the greater is the phase variation). By detecting and processing the vibration of the phase and the amplitude of the electromagnetic signals transferred from the pointer device, the digitizer tablet may distinguish the pointer device is kept in touch with the surface of the digitizer tablet or within the inductive altitude of the digitizer tablet, and may also know which function the user is desired to perform in that time. When the user presses the key switch of the pointer device, it will make specific capacitor paralleled with resonant circuit, such that it will also cause the frequency of the electromagnetic signals resonated in the pointer device and transferred back to the digitizer tablet to be lowered down and the phase variation to be made greater and, by detecting the variation of phase, the digitizer tablet will be noticed which key switch the user has already pressed.

There are several disadvantages for this kind of prior-art technique that processes the resonant frequency (phase) of the pointer device by the manner of changing the capacitance:

(1) From this prior-art technique, the variation of the frequency by the manner of the "variable capacitor" with the tip of the pointer device so, when the pressure applied on the active area of the digitizer tablet by the tip of the pointer device is different, the capacitance of this resonant circuit (variable capacitor) will be enlarged slightly; that is, the variation of the frequency is not very much, so it is relatively difficulty to detect the magnitude of the pressure pressed on the active area of the digitizer tablet by the amount of the "frequency variation". Therefore, for the prior-art technique that applies the manner of detecting the "phase change" difference of frequency to decide the pressure pressed by the tip, not only more precise measurement is required, but also the circuit design is complex and the production cost is increased.

(2) For this prior-art technique, no matter when the user presses the key switch of the pointer device or presses down the tip of the pointer device on the active area of the digitizer tablet, they will both cause the resonant frequency of the pointer device to be lowered down. In order to distinguish both operations of the pen tip and the key switch pressing for avoiding wrong judgment, this prior-art technique has a large range of each frequency variation generated from both the tip and the key switch pressing (frequency difference must be enlarged). Relatively, all the required accuracy and the complicity on the circuit design will be increased for distinguishing the frequency difference, and it is difficult to further lower down the cost either.

SUMMARY OF THE INVENTION

The objective of the invention is to provide a set of inductive loops and an approach for emitting and receiving the signal of a wireless pointer device (particularly, a wireless pointer device without battery). The approach of emitting and receiving the signal of the inductive loop is to emit several signals sequentially from a specific inductive loop which dominated the coordinates detecting range of a wireless pointer device located on the active area of a digitizer tablet, and several nearby inductive loops located at the specific inductive loop are sequentially, respectively, and inductively receive the resonant signal emitted from the pointer device. Through this kind of processing, the magnitude of induced signals are in linear relationship and, according to the linear relationship of the several induced signals, it may position the cursor of the pointer device, so it may greatly simplify the calculation formula for the coordinates and the design of the related circuit elements required for coordinates calculating, and it may further reduce the production cost and the power consumption.

Another objective of the invention is to design an pointer device without battery (such as: pen, mouse, and puck, etc.) for this inductive loops according to the invention, including an resonant circuit comprised of variable inductors and capacitors to induce and receive electromagnetic energy that is resonated, energized, and emitted back to the digitizer tablet, such that it may function as the power source of the pointer device of batteryless type. Further, when the user operates the pen type pointer device to press the pen tip on the digitizer tablet, the variable inductor according to the invention is designed to increase the resonant frequency and, relatively, when the user presses the key switch on the pointer device, it will decrease the resonant frequency. Since the difference of the variation of frequency (one is the increase of frequency, and the another is the decrease of frequency) when the pen tip is pressed on the digitizer tablet or the key pressed is operated so, not only may the invention easily judge which function the user is operating for reducing the probability of wrong judgment, but also is the accuracy of the frequency detection lowered down, such that the circuit design is relatively simple and the cost may be further reduced. The invention may directly judge the pressure pressed down by the pen tip by sensing the "variation amount of frequency", so the needed circuit design is much simpler relatively, it is also unnecessary to require more precisely sensing technology, and the cost is lower relatively.

For further describing the invention in detail, several preferable embodiments in matching with corresponding block diagrams are presented as follows.

DETAILED DESCRIPTION OF THE INVENTION

Figure 1:
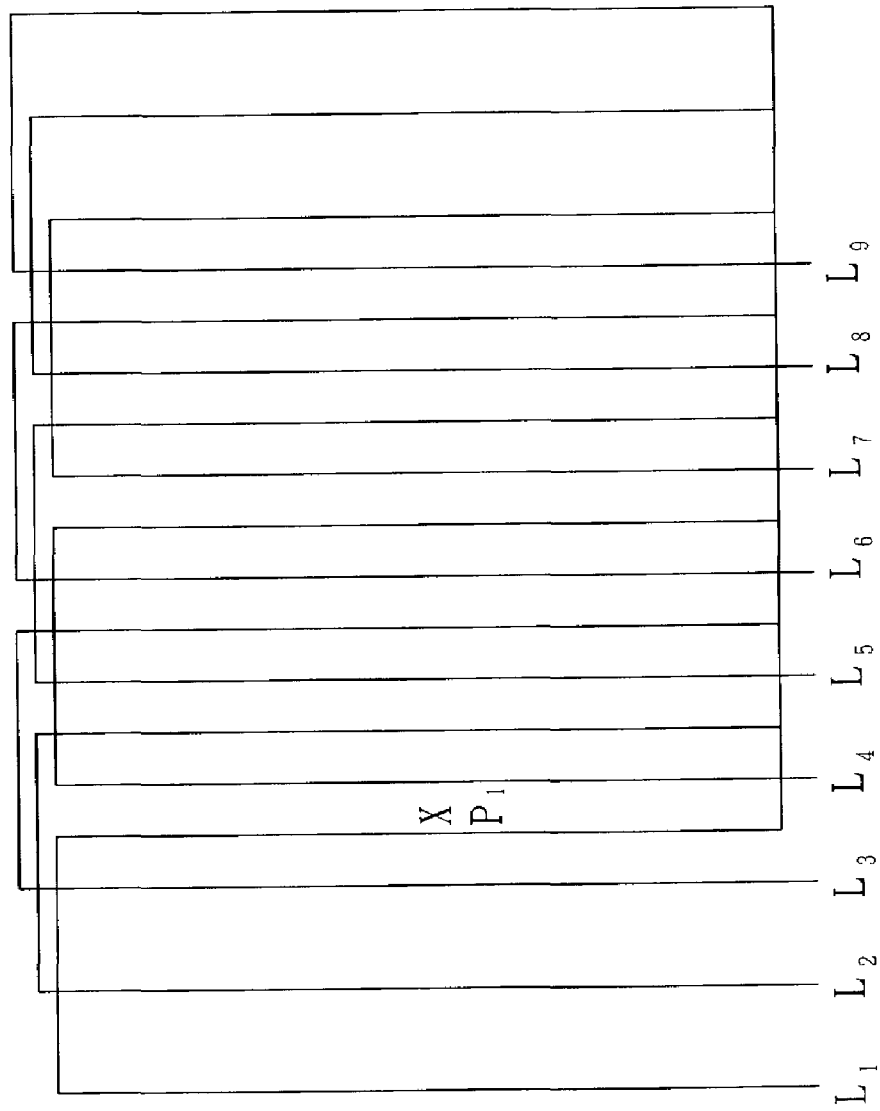
FIG. 1 is an illustration for the inductive loop of a digitizer tablet according to the prior arts.

The main characteristic of the technical of the improving the circuits of the apparatus and method for pointer system of digitizer tablet according to the invention is to sequentially and respectively emit signal from a first set of inductive loop, of which the magnitude of the induced signal is the most strong, when the pointed position of a wireless pointer device is located within a predetermined range formed by the first set of inductive loop that has the strongest induced signal among several sets of inductive loop during a local scan being under processing. The emitted signal is received and energized temporarily by the wireless pointer device and then again emits a resonant signal, which is received sequentially by several sets of inductive loop at the adjacency of the first set of inductive loop, such that the coordinates of the wireless pointer device relative to digitizer tablet is calculated and the function and key status of the wireless pointer device is also sensed. Thereby, the intensities of the resonant signals received by the several sets of inductive loop will be in a linear relationship, so the calculation formula for the coordinates of pointer device and the circuit design for processing calculation can be simplified greatly, the production cost and the power consumption may further be reduced, and the shortcoming of the prior-art techniques can be improved effectively.

As a simple example, the invention is to provide a signal transferring method for the pointer system of a digitizer tablet, which includes a digitizer tablet and a wireless pointer device, wherein there are plural sets of inductive loop arranged sequentially in the digitizer tablet, and the wireless pointer device has a resonant circuit for energy storage. The method is comprised of following steps:

(A0) Processing a global scan to find the coarse position where the pointer device is located, dominated to $m^{th}$ inductive loop, wherein m is a positive integer;

(A) Emitting a first signal from the $m^{th}$ inductive loop, and the resonant circuit of the pointer device is induced by the first signal and the energy is storaged in the resonant circuit. After the time of a full storage energy interval, the $m^{th}$ inductive loop stop emitting, and then the pointer device emit the stored energy out;

(B) The $(m-n)^{th}$ inductive loop induced by the re-emitted energy which is emitted by the pointer device, wherein n is an integer and, if m−n is less than one, then Step (B) will be skipped;

(C) Increasing the (m−n) value sequentially, and execute Step (A) and Step (B) repetitiously until the $(m-n+i)^{th}$ inductive loop inducing the resonant signal that come from the pointer device, wherein i=2n+1 preferably;

(D) According to the resonant signals induced by the $(m-n)^{th} \sim (m-n+i)^{th}$ inductive loops, it may calculate the coordinates of the wireless pointer device on the digitizer tablet relatively.

Furthermore, another characteristic of the invention is that the wireless pointer device includes a resonant circuit which comprises a variable inductor and several capacitors connected in parallel. The resonant circuit can be induced by the electromagnetic energy provided from the inductive loop of the digitizer tablet as an energy power source. The wireless pointer device also has a key switch connected in series with one of the capacitors and a pen tip brought along with the variable inductor. When this key switch is pressed, the resonant frequency of the resonant circuit will be decreased. Further, when the pen tip is pressed down, the inductance changing of the variable inductor will cause the resonant frequency of the resonant circuit to be increased. In other words, when the wireless pointer device according to the invention is processing the "pressing key" and the "pressing down the pen tip on the surface of the digitizer tablet", the trend of the variation of the resonant frequency caused by both operations will be in "reversing direction", so the operational functions of the "pressing key" and the "pressing down the pen tip on the surface of the digitizer tablet can be distinguished easily.

Further, because the "variable inductor" is brought along with the pen tip of the pointer device, the generated "the variation of the frequency" is larger when the pen tip is pressed down more, so the invention may directly judge the pressed down pressure of the pen tip by sensing the "the variation of the frequency". This technique is different from the prior arts that normally require to detect the "phase difference" of the frequency to decide the pressure of the pen tip. Therefore, because the pointer device according to the invention may bring along the "variable inductor" with the pen tip of the pointer device to make a frequency variation when the pen tip is pressed down, it may make the circuit design needed for the invention to detect the magnitude of the pressure of the pen tip to be much simpler, a more accurate detecting technology is not necessary, and the cost is lowered down relatively.

As presented in the following, several preferable embodiments matching with corresponding drawings will describe in detail about the technical characteristics, the motion manners, and the achievable functions of the invention.

Figure 2:
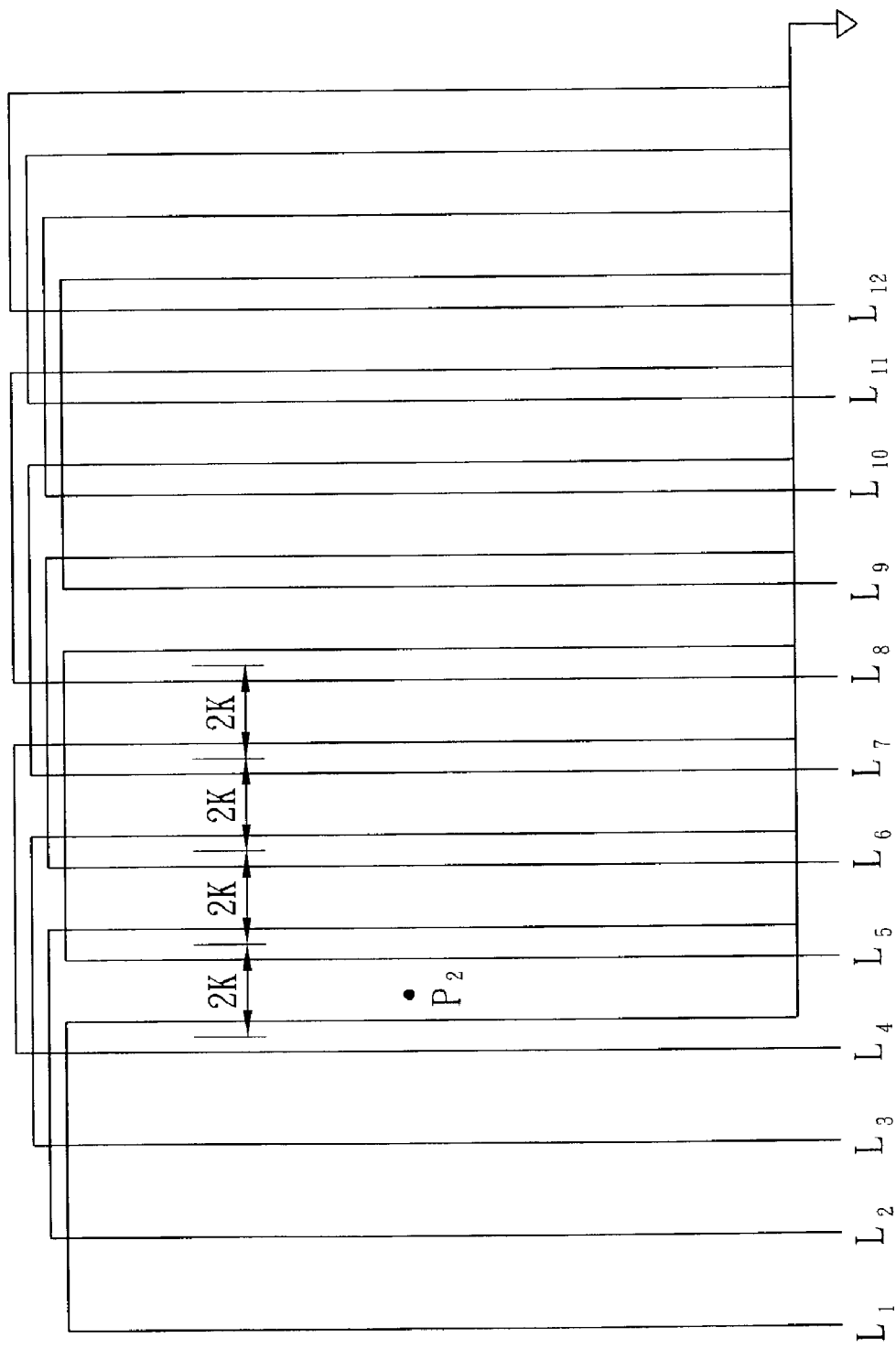
FIG. 2 is a preferable embodiment for illustrating the inductive loops according to the present invention.

Please refer to FIG. 2, which is a preferable embodiment for illustrating the inductive loop on the digitizer tablet according to the invention, and this is only an illustration for the inductive loop belonged to one specific axial direction.

The procedure of the positioning for the coordinates of the wireless pointer device will be illustrated in two processing stages, which will be described respectively as follows:

(1) The global scanning stage: when the pointer system is not in the working area of the digitizer tablet, the processing circuits of the digitizer tablet will sequentially make detection for each inductive loop belonged to specific axis, so the digitizer tablet may accurately and quickly sense which inductive loop the position of the pointer device is located on, as soon as the pointer device is in proximity altitude above the working area of the digitizer tablet; if the global scanning process has sensed the coarse position which the pointer device is located on, then process the local scanning procedure. Since the global scanning process described herein is belonged to the prior arts and is not the key technique of the invention, so detailed description about the global scanning process is not presented thereinafter.

(2) The local scanning stage: only the several inductive loops at the adjacency of the inductive loop, on which the position of the pointer device is located, are under detection; the objectives of this stage are two: first, tracing the moving traces of the pointer device; second, calculating the accuracy coordinates of the pointer device in the working area. This local scanning stage is one emphasis of the invention, so a detailed description will be presented thereinafter.

Next, the following will describe the local scanning process according to the invention. As shown in FIG. 2, from the inductive loop L1 to the inductive loop L5, each has an initial terminal and also has an ending terminal connected to the ground in the same way, and each of which is formed as a loop range enclosing a specific area by starting from the initial terminal to the ending terminal, and the enclosed area for each inductive loop is made as similar as possible. In the preferable embodiment according to the invention, after global scanning, if the coarse position, on which the pointer device is located, is found and within the range decided by the inductive loop L3, then process the partial scan stage for finding the accuracy coordinates. The procedures are: an electromagnetic energy of a specific frequency is emitted from the inductive loop L3 at one certain time interval, called as the first time interval, sequentially, and the electromagnetic energy is induced by the L-C type resonant circuit of the pointer device and the energy is stored in the resonant circuit respectively. After the energy storage is completed, the inductive loop L1~L5 re-inducing the energy from the pointer device respectively at another certain time interval. The length of said first time interval is relevant to the quality factor of the L-C type resonant circuit of the pointer device. So, in order to achieve the best performance of energy storage for the resonant circuit, it needs more time to store the energy fully and, afterwards, the electromagnetic energy is stopped emitting from the inductive loop L3. At this time, the L-C type resonant circuit of the pointer device will release the electromagnetic energy originally stored therein into the adjacent space, and the released electromagnetic energy will be induced by the other adjacent inductive loops (L1~L5). After being induced by the inductive loops, this electromagnetic energy will be converted to an electrical signal in sine waveform. The processing procedure is described in detail thereinafter.

(I) The electromagnetic energy emitted from the inductive loop L3 is transferred to the pointer device, again from which the electromagnetic energy is transferred and is further induced by the inductive loop L1;

(II) The electromagnetic energy emitted from the inductive loop L3 is transferred to the pointer device, again from which the electromagnetic energy is transferred and is further induced by the inductive loop L2;

(III) The electromagnetic energy emitted from the inductive loop L3 is transferred to the pointer device, again from which the electromagnetic energy is transferred and is further induced by the inductive loop L3;

(IV) The electromagnetic energy emitted from the inductive loop L3 is transferred to the pointer device, again from which the electromagnetic energy is transferred and is further induced by the inductive loop L4;

(V) The electromagnetic energy emitted from the inductive loop L3 is transferred to the pointer device, again from which the electromagnetic energy is transferred and is further induced by the inductive loop L5;

In other words, if the position P2 of the pointer device is located in the range decided by the inductive loop L3, then the electromagnetic energy emitted every time from the same source—inductive loop L3 will store the most full and sufficient energy in the pointer device (generally speaking, the intensity of the magnetic field is proportional inversely to the distance square), so it is very efficient for the inductive loop L3 to emit an electromagnetic energy that is induced by each inductive loops at its adjacency of two sides, and the performance is most stable. Furthermore, since the electromagnetic energy is emitted out from same inductive loop L3 and is induced by other inductive loops (L1~L5), so the intensities of these signals induced by the inductive loops L1, L2, L3, L4, and L5 will be roughly in linear relationship for processing the coordinates calculation. This relationship will simplify the calculation formula and decrease the complexity of programming. And, it may further spend less time on processing signals, and may be in lower complication and cost for designing circuit.

As far as the coordinates calculation described above is concerned, for example, if L3 induce a largest inducing voltage, Voltage3, that is converted by an A/D converter to become a digital value of V3, and L2 induce an inducing voltage, Voltage2, that is converted by an A/D converter to become a digital value of V2 and, further, L4 induce an inducing voltage, Voltage4, that is converted by an A/D converter to become a digital value of V4, while K is the largest resolution constant (please refer to FIG. 2), then the calculation method for a specific position in certain axial direction is as follows:

When $V2>V4$, then the position=$K-\{K(V2-V4)/[(V3-V2)+(V3-V4)]\}$;

When $V2<V4$, then the position=$K-\{K(V4-V2)/[(V3-V2)+(V3-V4)]\}$;

When $V2=V4$, then the position=$K$.

According to the above method, it can find the coordinates pointed by the pointer device located on the digitizer tablet.

Figure 3:
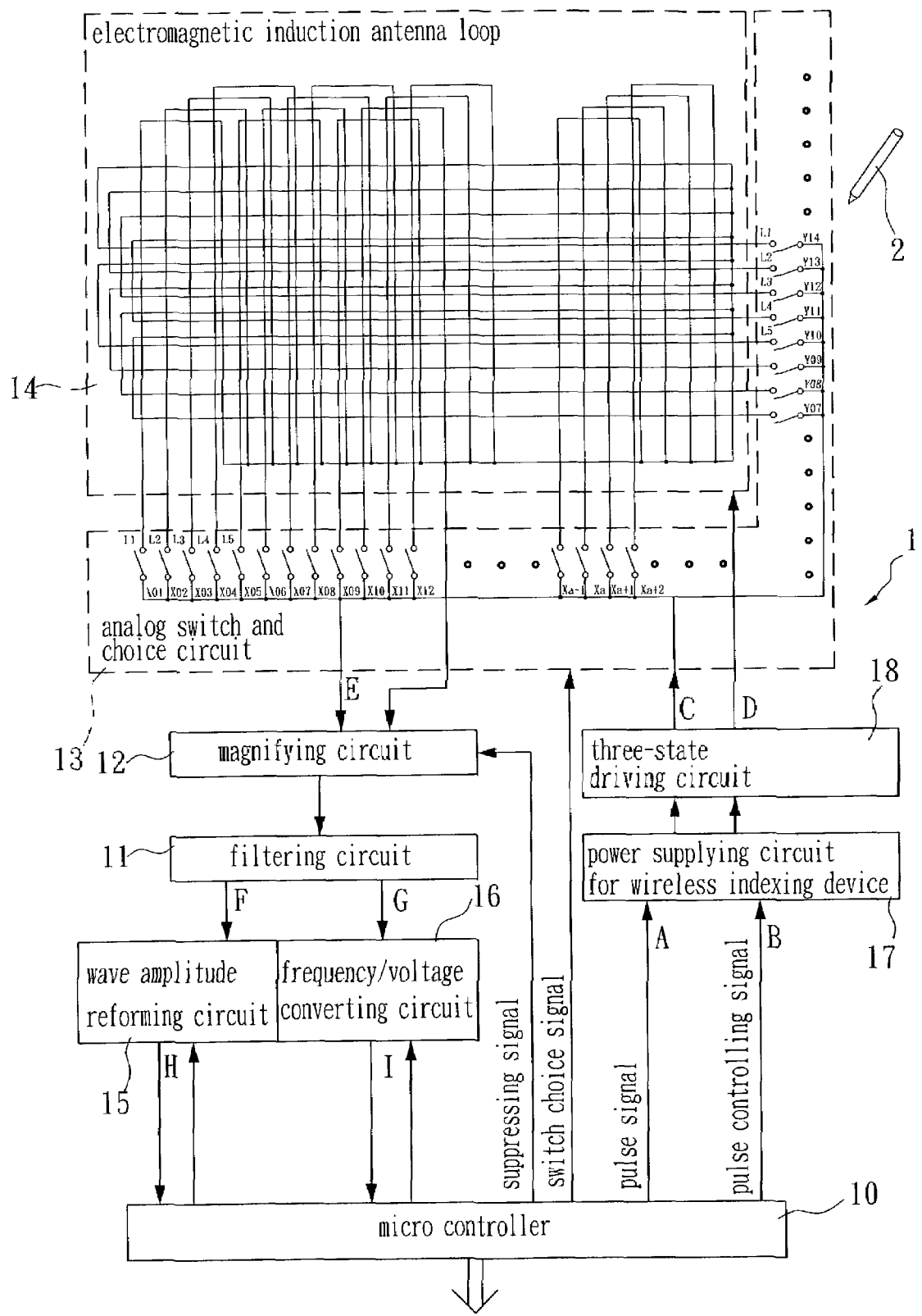
FIG. 3 is a preferable embodiment for the circuit block diagram according to the present invention.

Please refer to FIG. 3, which is a preferred embodiment of circuit block diagram according to the invention. As shown in FIG. 3, the invention includes a digitizer tablet 1 and a wireless pointer device (for example, a wireless digitizer pen 2). The digitizer tablet 1 further includes several inductive loops 14 in the direction of X-axis and Y-axis, an analog switch and selection circuit 13, an amplification circuit 12, a filter circuit 11, a waveform generation circuit 15, a frequency to voltage converter circuit 17, a micro controller 10, a power supply circuit 17 for wireless pointer device, and a tri-state driving circuit 18.

Wherein, the digitizer tablet 1 has a working area (the working area is comprised of the inductive loops in the directions of X-axis and Y-axis), which may induce the electromagnetic energy emitted from the wireless pointer device 2 and generate inductive signals that may decide the coordinates where the wireless pointer device 2 is located. The several inductive loops 14 in the directions of X-axis and Y-axis are arranged sequentially and orderly and form the coordinate system in the directions of X-axis and Y-axis respectively. Of course, according to the working area of different sizes, the total count of the inductive loop is difference. As shown in FIG. 2 and FIG. 3, each one of the inductive loops L1, L2, L3, L4, L5 . . . forms into a specific but different sensing range (FIG. 3 is only an illustration for showing the distances and sensing range among each inductive loops L1, L2, L3, L4, L5 . . . ). By weaving the X-axis's inductive loops and the Y-axis's inductive loops, a specific active area is formed, and the wireless pointer device 2 is induced if it is within the active area comprised by the inductive loops 14.

The analog switch and selection circuit 13, connected to the inductive loops 14, is controlled sequentially by the micro controller 10 to perform the global scan and the local scan process at both X and Y directions, such that it may receive sequentially and inductively the electromagnetic signals induced by different inductive loops, so the number of analog switches corresponds with the number of inductive loops 14. The function of the amplification circuit 12, receiving the signals come from analog switches, is to amplify the signals appropriately and output them to the band pass filter circuit. The function of the filter circuit 11, receiving the amplified signals output from the amplification circuit 12, is to filter them (cut off the signals whose frequency is out of the pass band). In this invention, it can be implemented by a high pass filter (HPF).

The function of the waveform generation circuit 15, which is controlled appropriately by the micro controller 10 and further send the signal to the built-in A/D converter (not shown in the FIG. 3) of the micro controller 10 for converting analog signal to digital signal, is to receive the signal output from the filter circuit 11 and output a signal which carry an amplitude information and this signal is to calculate the coordinates of the wireless pointer device. The function of the frequency to voltage converter circuit 16 is to convert the signal output from the filter circuit 11 to a signal whose voltage carry the frequency information, with processing this signal by the micro controller 10 appropriately, and send this signal to another built-in A/D converter circuit (not shown in FIG. 3) of the micro controller 10 to convert an analog signal to digital signal. This signal is relative to the function status of the wireless pointer device (for example, the pressure of pen tip, and the key switch status of mouse . . . ). This set of coordinates and status will be stored temporarily in a RAM (Random Access Memory) of the micro controller 10 and then communicate to the host machine with the interface in a proper time slot. By the host machine's further process, this set of coordinates and status will be responded and shown on the display device of the host machine, which may be a computer system, an operational process system, or even a system that needs the cursor pointer or the input device of hand writing.

The micro controller 10 outputs a set of controlling signals, which will synchronize the processing timing. These signals will enable or disable the wireless pointer device's power supply circuit 17 and the tri-state driving circuit 18. The micro controller 10 yet outputs a pulse signal of a specific frequency, by controlling the enabling or disabling mechanism of the wireless pointer device's power supply circuit 17 and the tri-state driving circuit 18, which will be sent to the inductive loops 14 intermittently (as described above, the electromagnetic energy transmitting process is executed at one time slot and is inhibited at another time slot), by which the electromagnetic energy of a specific frequency may be scattered over the space at the adjacency;

that is, with a specific frequency, the electromagnetic energy emitted from the power supply circuit 17 of the wireless pointer device, the tri-state driving circuit 18 and the inductive loops 14 is utilized as the power source of the wireless pointer device 2.

Figure 4:
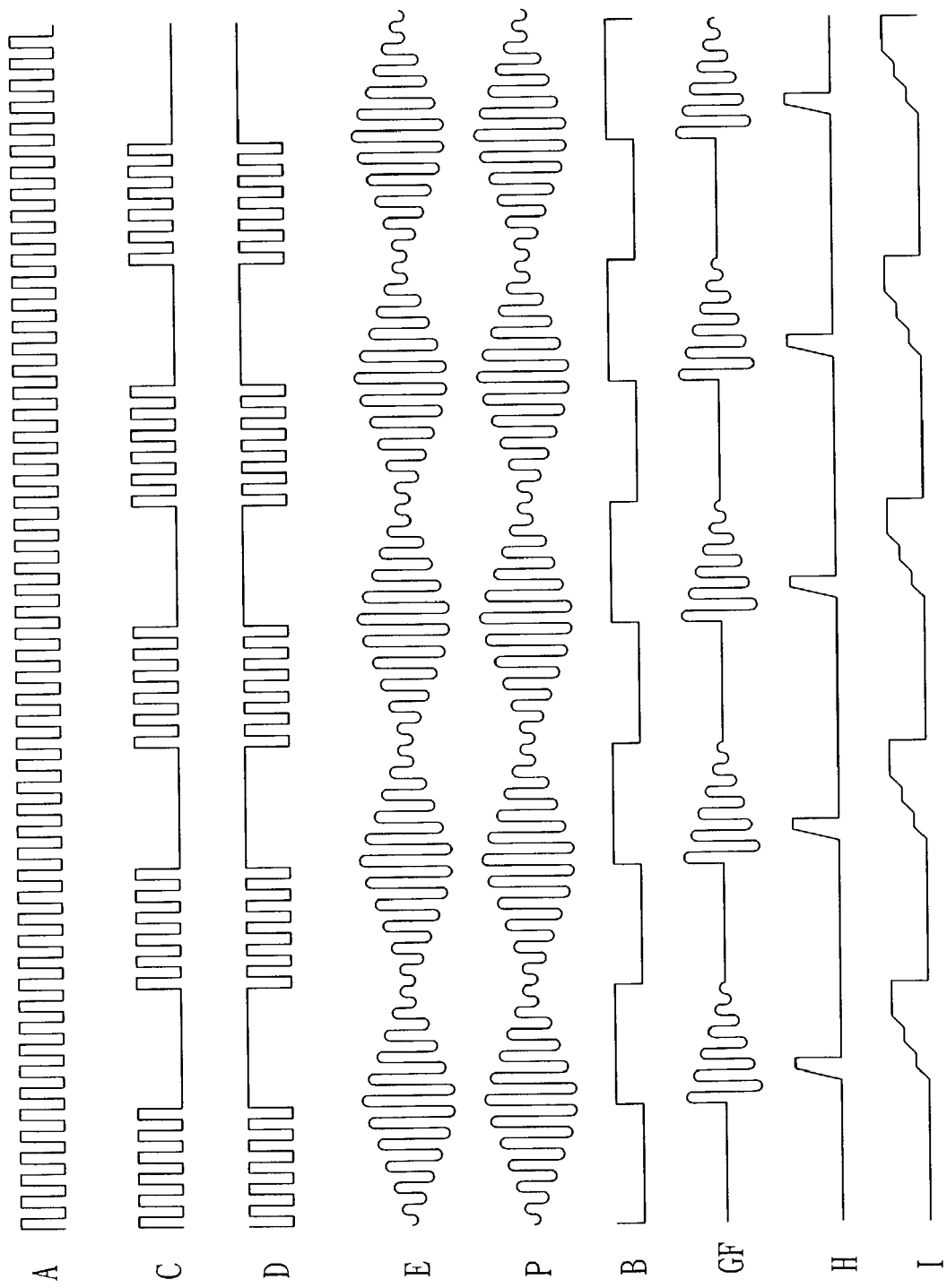
FIG. 4 is a preferable embodiment for illustrating the waveforms according to the present invention.

Furthermore, the micro controller 10 yet may respectively control the waveform generation circuit 15 and the frequency to voltage converter circuit 16 for deciding whether the micro controller 10 will process these signals transferred from the waveform generation circuit 15 and the frequency to voltage converter circuit 16. The micro controller 10 also output a set of selection signals to the analog switch and selection circuit 13 for selecting which analog switch is turned on. These selection signals may switch on a specific analog switch, and then may connect the specific inductive loop to the tri-state driving circuit 18 and the amplification circuit 12 for electromagnetic energy interacting. Moreover, the micro controller 10 may also output a signal to suppress the output of the amplification circuit 12 during the first time slot. The signal come from analog switch is useless for pointer device positioning in this duration. The function of the power supply circuit of the wireless pointer device 17 is to receive the pulse signal, with a specific frequency, output from the micro controller 10, by controlling the electromagnetic energy emitting and receiving circuit with a set of controlling signals, and transfer the pulse signal to the tri-state circuit 18. The tri-state driving circuit 18 is also controlled by the set of controlling signals, and output two signals out of phase by 180° at the same frequency. One of the two signals is transferred to a specific inductive loop, and another is transferred to the common line of all inductive loops. In other words, this circuit transmits the pulse signal energy into the nearby space with a specific inductive loop and the common line. Please refer to FIG. 4, which is a preferable embodiment for illustrating these waveforms of the invention. Wherein, each waveform, whose counts, timing and amplitude depend on the actual situation, is only an illustration for explanation. Please refer to FIG. 3, wherein A signal is a pulse signal output from the micro controller 10. B signal is a set of signals for controlling the enabling or disabling mechanism of the power supplying circuit 17 of the wireless pointer device. C signal and D signal are two signals output from the tri-state driving circuit 18. The E signal is a waveform of the electromagnetic signal emitted and received from a specific inductive loop that passing through the specific analog switch. F and G signals are the output waveforms that has been controlled appropriately, filtered and amplified. As refer to E signal, the front half section of the waveform of the F and G signal is cutting off (p.s. because it is in energy-emitting time slot and there is not useful information in the part of the waveform, it is cut off). H signal, of which the amplitude is inversely proportion to the distance between the inductive loop and the pointer device, has been processed. So, this signal carries the position information. This signal will be sent to the A/D converter circuit of the micro controller 10 to convert analog signal to digital signal. The I signal, of which the amplitude is related with frequency, will be transferred to the built-in A/D converter circuit of the micro controller 10 and then convert analog signal to digital signal. So, this signal carries the pen tip's pressure and key status information. The P signal, not shown in the FIG. 3, is measured from the pointer device's circuit. It is quite obvious that this signal is similar to the E signal.

Figure 5:
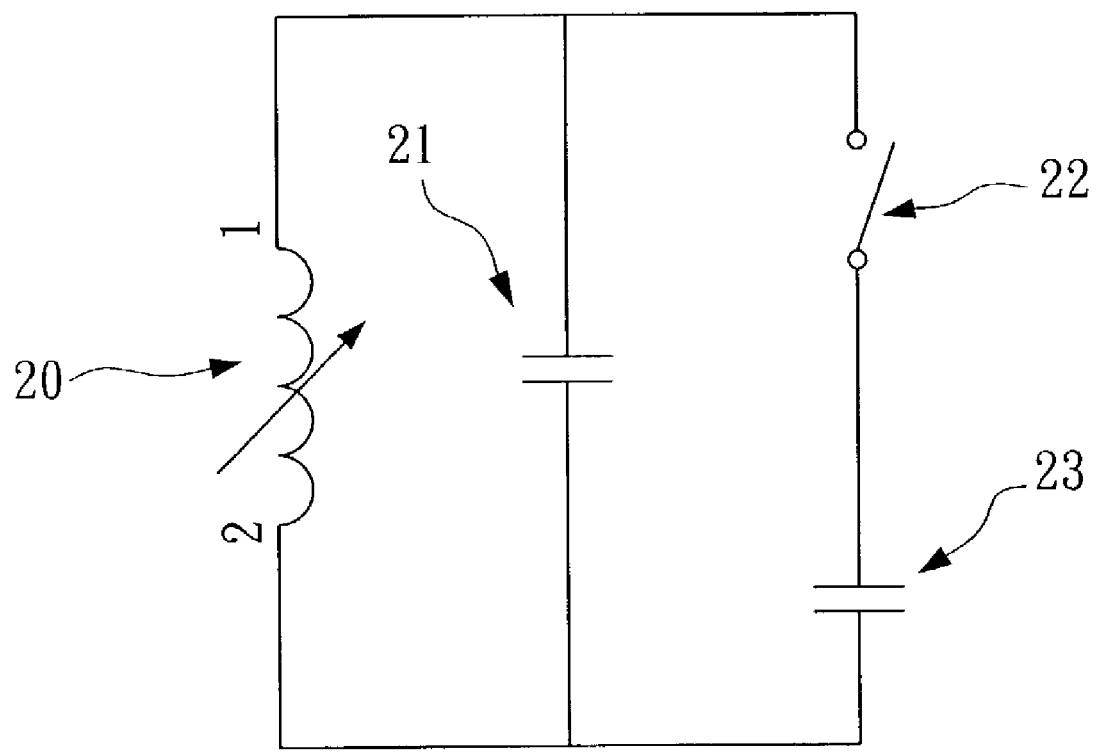
FIG. 5 is a preferable embodiment for illustrating the internal circuit of the wireless pointer device according to the present invention.

Please refer to FIG. 5, which is a preferred embodiment for the illustration of the circuit of the wireless pointer device according to the invention. As shown in FIG. 5, which is a circuit design meet this invention for power supply, and which is a resonant circuit constructed in parallel by a variable inductor 20 and two capacitors 21, 23. The resonant circuit induces the electromagnetic energy supplied from the digitizer tablet as a power source. Switch 22 is a key switch. When this switch is turned on, a small capacitor 23 will be paralleled to the resonant circuit and the resonant frequency will change a little (when the switch is pressed, the resonant frequency will decrease). By the frequency to voltage converter circuit 16 converting, the different frequency will be converted into different voltage. The key feature of the invention is that the inductor 20 is a variable inductor. Since the variety of the variable inductor is larger than that of the variable capacitor, so it does not the main consideration when design this circuit. Further, the action of the variable inductor according to the invention is that when the user presses the pen tip of this pointer device upon the surface of the digitizer tablet, the inductance will decrease and the resonant frequency will increase. In other words, when the wireless pointer device is in the "pressing key switch" working function and the "pressing the pen tip down" working function, the trends of the variation of the resonant frequency are different and these functions will be distinguished easily. In such way, we can set the frequency range roughly and distinguish these functions from each other without fault. And, the design of the pointer device in this invention doesn't need any battery as the power source. The wireless pointer device according to the invention may be a wireless and batteryless stylus a wireless & batteryless digitizer pen, a wireless & batteryless mouse, and a wireless & batteryless puck, etc.

In addition, according to the invention, the pen tip of the pointer device is work along with the variable inductor, and the variation of inductance and frequency are wider. Therefore, we can know what function be executed not by detecting the phase difference but by detecting the variation of frequency. Thus, this circuit is very simple, skill-less, accuracy-less and low cost to implement these functions, pressing key switch and pressing the pen tip down, with this variable inductor 20. Another particular issue is that although the pointer device is consisted of only one set of one capacitor or more in series with a specific switch shown in preferable embodiment, it is doubtless that if there are more than one switch is consisting of the pointer device and then the pointer device is consisted of more than one set of that.

Figure 6:
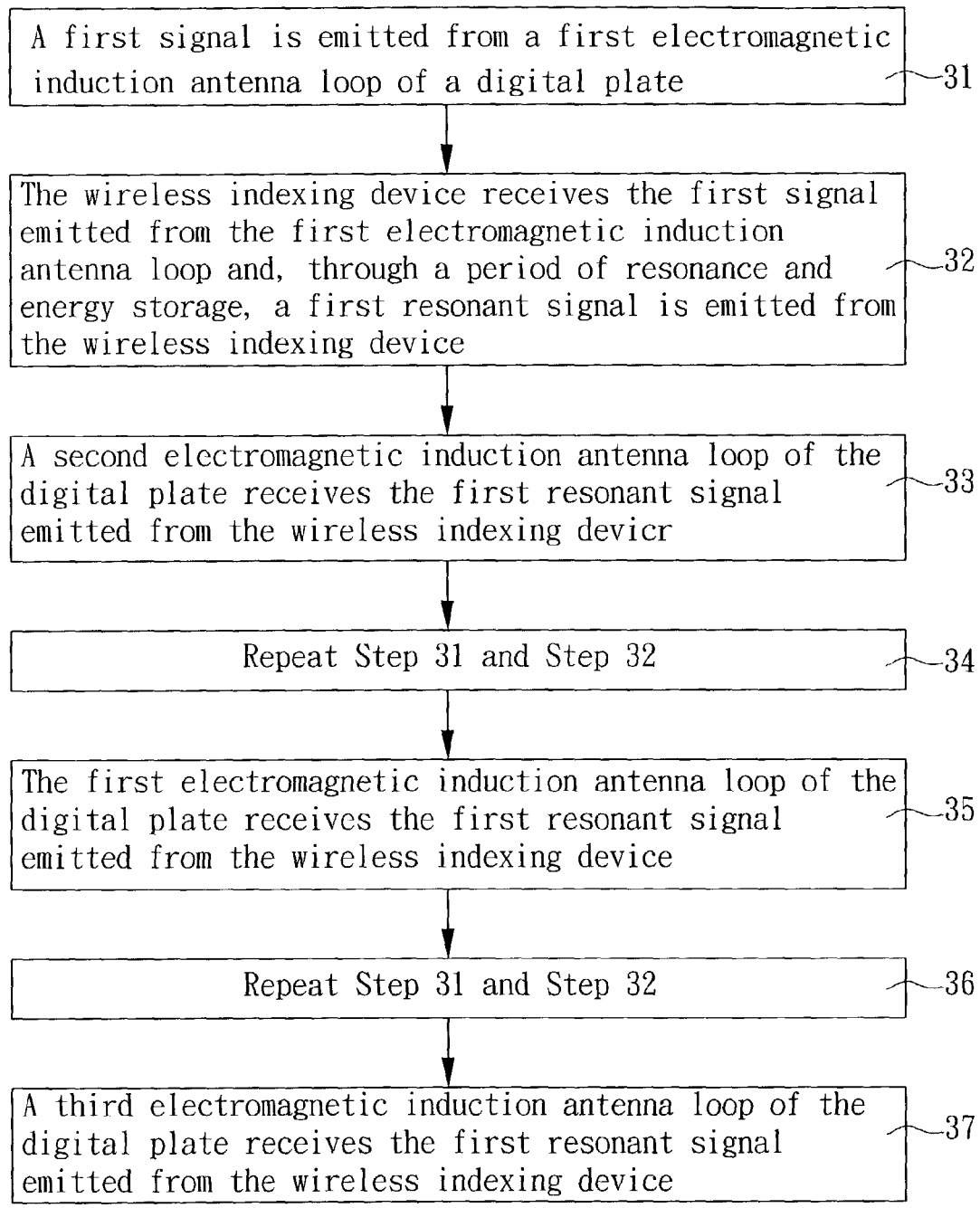
FIG. 6 is a flow chart for the procedure according to the present invention.

Please refer to FIG. 6, which is a flow chart diagram according to the invention. There is an algorithm in partial scan procedure, referring the detail descriptions of the FIG. 2, besides the circuit of the pointer device that we mentioned above. The improved method for exchanging the signal between the wireless pointer device and the digitizer tablet is applied with the inductive loops and the wireless pointer device. The procedures of the signal exchanging are shown below:

a. A first signal is emitted from a first inductive loop of a digitizer tablet (Step 31);

b. The wireless pointer device is induced the first signal emitted from the first inductive loop and, after a time slot for energy storing, a first resonant signal is emitted from the wireless pointer device (Step 32);

c. A second inductive loop of the digitizer tablet is induced the first resonant signal emitted from the wireless pointer device (Step 33);

d. Repeat Step 31 and Step 32 (Step 34);

e. The first inductive loop of the digitizer tablet is induced the first resonant signal emitted from the wireless pointer device (Step 35);

f. Repeat Step 31 to Step 32 (Step 36);

g. A third inductive loop of the digitizer tablet is induced the first resonant signal emitted from the wireless pointer device (Step 37).

Wherein, the first inductive loop said in Step a is correspondent to the inductive loop L3 said in FIG. 2 concerning the local scan.

Wherein, the second inductive loop said in Step c is referred sequentially to: inductive loop L1 (when Step a and Step b are executed twice), inductive loop L2 (when Step 1 and Step b are executed once).

Wherein, the third e inductive loop said in Step g is referred sequentially to: inductive loop L4 (when Step f and Step g are executed once), inductive loop L5 (when Step f and Step g are executed twice).

As a summary, the invention discloses an improved partial scan process for a digitizer pointer system which includes a wireless digitizer pointer and a digitizer tablet. With these approaches, inductive loops layout, energy exchange method, the device of variable inductor, the coordinates calculating with linear relationship, the filter circuit and different frequency variation trend of the "pressing key" and "pressing the pen tip down", we can improve the prior art's disadvantage. The important features of this invention are all disclosed in detail in each preferable embodiment. It is sufficient and apparent that the objections and efficiencies of this invention are progressive, easy to implement and economical value in production. And, the products, with this invention, are never manufactured to current market.

What is claimed is:

1. A signal transmitting method for a pointer system of a digitizer tablet device, which comprises a digitizer tablet and a wireless pointer device, said digitizer tablet having a plurality of electromagnetic inductive loops arranged in order, said wireless pointer device having an energy-storing resonant circuit, said method comprising the following steps:

(A) emitting a first signal from an $m^{th}$ inductive loop on the digitizer tablet, and causing the resonant circuit of the wireless pointer device to emit a resonant signal after resonation and energy storing, wherein m is a positive integer;

(B) receiving said resonant signal by an $(m-n)^{th}$ inductive loop on the digitizer tablet, wherein n is an integer;

(C) progressively increasing a value of (m−n) and repeating steps (A) and (B) until the $(m-n+i)^{th}$ inductive loop receives said resonant signal, i being a positive integer;

(D) changing the frequency of the resonant signal emitted by the wireless pointer device by changing a variable inductance and capacitance such that the frequency of the resonant signal increases when the tip of the wireless pointer device is pressed against the digitizer tablet device, and decreases when the key switch on the wireless pointer device is pressed; and, (E) calculating a coordinate position on the digitizer table of the wireless pointer device according to the frequencies of the resonant signals received by the $(m-n)^{th}$ to $(m-n+i)^{th}$ inductive loops on said digitizer tablet.

2. The signal transmitting method of claim 1, wherein the following step is further included before step (A):

(A0) globally scanning the digitizer tablet to initially identify that the wireless pointer device is relatively closer to a certain inductive loop on the digitizer tablet, said inductive loop initially identified to be closer to the wireless pointer device being said $m^{th}$ inductive loop.

3. The signal transmitting method of claim 1, wherein, if the value of (m−n) is lower than 1, step (B) is omitted.

4. The signal transmitting method of claim 1, wherein an intensity of the resonant signals received by the $(m-n)^{th}$ to $(m-n+i)^{th}$ inductive loops changes according to a linear relationship.

5. The signal transmitting method of claim 1, wherein i=2n+1.

6. The signal transmitting method of claim 1, wherein said plurality of inductive loops receive amplitude information and frequency information of said resonant signal.

7. The signal transmitting method of claim 1, wherein said wireless pointer device is a wireless digital pen.

8. The signal transmitting method of claim 1, wherein said wireless pointer device is a batteryless digital pen.

9. The signal transmitting method of claim 1, wherein starting terminals of three inductive loops are included in one set of inductive loops.

10. The signal transmitting method of claim 1, wherein a variable inductive circuit is further included in wireless pointer device.

11. A pointer system for a digitizer tablet device comprising:

a) a wireless pointer device having a tip and a key switch; and b) a digitizer tablet, which further comprises:

i) a plurality of electromagnetic inductive loops oriented in X-axis and Y-axis directions of a coordinate system, each forming specific inductive scope;

ii) an analog switch and selecting circuit connected with said electromagnetic inductive loops and controlling induction of the electromagnetic inductive loops in X-axis and Y-axis directions in said electromagnetic inductive loops through a microprocessor, including a number of switches equal to the number of said plurality of electromagnetic inductive loops;

iii) an amplifying circuit, receiving a suppressing signal of said microprocessor and output inductive signals from said analog switch and selecting circuit, and said electromagnetic inductive loops, the amplifying circuit amplifying and then outputting the signals;

iv) a filtering circuit, receiving signals output by said amplifying circuit and outputting filtered signals to said microprocessor;

v) a waveform amplitude regulating circuit, receiving signals output by said filtering circuit and outputting amplitude regulated signals to said microprocessor;

vi) a frequency/voltage converting circuit, receiving signals output by said filtering circuit and converting such signals into voltage signals, sending said voltage signals to said microprocessor for processing, the signals being saved temporarily in said microprocessor after being processed;

vii) a power supply circuit in the wireless pointer device receiving a pulse wave controlling signal and a pulse wave signal of predetermined frequency output by said microprocessor, an energy source of the wireless pointer device is supplied by said pulse wave signal and said electromagnetic inductive loops, wherein said wireless pointer device changes resonant frequency by changing a variable inductance and capacitance such that the frequency of the resonant signal increases when the tip of the wireless pointer device is pressed against the digitizer tablet device, and decreases when the key switch on the wireless pointer device is pressed; and viii) a tri-state driving circuit receiving an output from said power supply circuit of said wireless pointer device and outputting two sets of inverting signals of logical level respectively to said analog switch and selecting circuit, and said electromagnetic inductive loops for enhancing said pulse wave signal;

wherein, said microprocessor controls and receives signals of said waveform amplitude regulating circuit and said frequency/voltage converting circuit, and processes the signals received to determine the X-axis and Y-axis position of the wireless pointer device on the digitizer tablet.

12. The pointer system for a digitizer tablet of claim 11, wherein said wireless pointer device is a wireless digital pen.

13. The pointer system for a digitizer tablet of claim 11, wherein said wireless pointer device is a batteryless and wireless pointer device.

14. The pointer system for a digitizer tablet of claim 11, wherein said wireless pointer device is a batteryless and wireless digital pen.

15. The pointer system for a digitizer tablet of claim 11, wherein a variation of intensity of resonant signals induced by the inductive loops is in a linear relationship.

16. The pointer system for a digitizer tablet of claim 11, wherein start terminals of three inductive loops are included in one set of inductive loops.

17. The pointer system for a digitizer tablet of claim 11, wherein said amplifying circuit is controlled by a suppressing signal of said microprocessor for determining signals sent to said filtering circuit.

18. The pointer system for a digitizer tablet of claim 11, wherein said filtering circuit includes a high pass filtering circuit.

19. The pointer system for a digitizer tablet of claim 11, wherein the wireless pointer device comprises a resonant circuit in which a variable inductance and a plurality of capacitance are connected in parallel, said resonant circuit inducting and receiving electromagnetic energy provided by inductive loops of the digitizer tablet as source of energy; the wireless pointer device further comprising key switch connected in series with one of the plurality of capacitance and a stylus connected with said variable inductance, such that when the key switch is switched off, a resonant frequency of the resonant circuit will be decreased, and when the stylus is pressed down, a variation of said variable inductance will increase the resonant frequency of resonant circuit.

20. A method for transmitting signals between a digitizer tablet and a wireless pointer device, wherein a plurality of electromagnetic inductive loops are oriented in X-axis and Y-axis directions of a coordinate system in the digitizer tablet induct electromagnetic signals, including conducting a full scan of said digitizer tablet to detect the wireless pointer device, thereafter conducting a partial scan after the full scan identifies an inductive loop where said wireless pointer device is located, the position determined by a first inductive loop having a most intensive induction among said plurality of inductive loops, said first loop emitting signals repeatedly and for a plurality of times at a first time interval; said wireless pointer device carrying out energy-storing and resonating processes and then emitting corresponding resonant signals, wherein said wireless pointer device changes resonant frequency by changing a variable inductance and capacitance such that the frequency of the resonant signal increases when the tip of the wireless pointer device is pressed against the digitizer tablet device, and decreases when the key switch on the wireless pointer device is pressed; and a plurality of inductive loops located close to the first inductive loop receiving said resonant signals at a second time interval.

21. The signal transmitting method of claim 20, wherein said plurality of sets of inductive loops receive amplitude information and frequency information of said resonant signal.

22. The signal transmitting method of claim 20, wherein said wireless pointer device is a wireless digital pen.

23. The signal transmitting method of claim 20, wherein said wireless pointer device is a batteryless digital pen.

24. The signal transmitting method of claim 20, wherein start terminals of three sets of inductive loops are included in one set of inductive loops.

* * * * *